United States Patent [19]

Katada et al.

[11] 3,904,538

[45] Sept. 9, 1975

[54] METHOD OF PRODUCING FERROMAGNETIC CHROMIUM DIOXIDES

[75] Inventors: Takeshi Katada; Tatsuji Kitamoto; Goro Akashi, all of Odawara, Japan

[73] Assignee: Fuji Photo Film Co., Ltd., Minami-Ashigara, Japan

[22] Filed: Aug. 28, 1972

[21] Appl. No.: 284,003

Related U.S. Application Data

[63] Continuation-in-part of Ser. No. 11,035, Feb. 12, 1970, abandoned.

[30] Foreign Application Priority Data

Feb. 12, 1969 Japan .............................. 44-10250

[52] U.S. Cl. ............................ 252/62.51; 423/607
[51] Int. Cl.[2] .................... C01G 37/02; C04B 35/12
[58] Field of Search .................. 252/62.51; 423/607

[56] References Cited

UNITED STATES PATENTS 3,278,263 10/1966 Cox .................................. 423/607

3,371,043 2/1968 Hund et al. ...................... 252/62.51

*Primary Examiner*—Jack Cooper
*Attorney, Agent, or Firm*—Sughrue, Rothwell, Mion, Zinn and Macpeak

[57] ABSTRACT

A method of producing a ferromagnetic chromium dioxide material which comprises heating a member selected from the group consisting of $CrO_3$ and a mixture of $CrO_3$ and at least one suitable additive, said additive improving the magnetic characteristics of said ferromagnetic material, to a temperature higher than 100°C, under a reduced pressure of from 0.1 to 0.95 atm. and then subjecting mixture of the resulting product and $CrO_3$ to a high temperature and high pressure treatment.

6 Claims, No Drawings

METHOD OF PRODUCING FERROMAGNETIC CHROMIUM DIOXIDES

CROSS REFERENCE TO RELATED APPLICATIONS

This is a continuation-in-part application of copending application, Ser. No. 11,035 filed Feb. 12, 1970, now abandoned.

BACKGROUND OF THE INVENTION

1. Field of the Invention

The present invention relates to an improvement in producing ferromagnetic chromium dioxide and more particularly to an improved method for economically producing an industrially-accepted ferromagnetic chromium dioxide having excellent and stable magnetic characteristics as compared with those ferromagnetic chromium dioxides prepared by conventional methods.

2. Description of the Prior Art

Ferromagnetic materials are used in a wide variety of applications, for instance, in magnetic recording tapes, drums, sheets and records, memory devices, cores, etc.

A conventional magnetic recording medium is composed of a support such as a plastic film, a metal- or glass-plate, etc., and a magnetic recording layer provided thereon by coating an acicular or granular powder of a ferromagnetic substance of less than 5 microns in size dispersed in a resinous binder and drying. Several substances, such as iron oxides, chromium dioxide, and ferromagnetic alloys per se are known to be useful as ferromagnetic substances, and, in particular chromium dioxide has been considered to be the most promising material because of its excellent and characteristic properties compared with other materials.

The formation of magnetic chromium oxides by heating $CrO_3$ in a stream of oxygen has already been observed by I. Shukoff, J. Russ. Ges., 41 (1909), pp. 302–304.

According to R. S. Schwartz and co-workers, J. Am Chem. Soc., 74, 1676 (1952), $CrO_2$ can be prepared from $CrO_3$ with traces of impurities of other oxides of chromium by heating for 3 hours at temperatures of 545°C under an increased oxygen pressure.

Glemser and co-workers, Z.f.anorg. Chem., 277 (1954), p. 114 et seq. investigated the thermal degradation products of $CrO_3$ radiographically and found that ferromagnetic $CrO_2$ is present in the rutile lattice.

B. J. Thamer and co-workers, J. Am Chem. Soc., 79, 1957, pp. 547–550, prepared $CrO_2$ contaminated by CrOOH by heating $CrO_3$ with $H_2O$ under pressure at temperatures of 300° to 325°C.

Ferromagnetic $CrO_2$ in which other metal oxides are incorporated in the lattice is described, for example, in U.S. Pat. No. 3,034,988. The magnetic properties of these $CrO_2$ mixed phases are improved compared with the magnetic properties of pure chromium dioxide. Above all, mixed phases could be prepared with very different Curie temperatures and coercivities.

In the preparation of these modified ferromagnetic chromium dioxides, finely divided $CrO_3$ mixed with other metal oxides is usually heated in the presence of water to temperatures up to 500°C under pressures of about 1 to 3000 atmospheres.

More recently, U.S. Pat. No. 3,371,043 discloses a process for the production of a ferromagnetic chromium dioxide containing material with a rutile type lattice. According to the above U.S. patent, ferromagnetic chromium dioxide is formed by a two-step doping process wherein chromium trioxide is heated with a guest component, or a precursor of such a guest component, and the resulting product is admixed with an additional guest component followed by heating.

In carrying out the process taught by U.S. Pat. No. 3,371,043, a finely divided chromium trioxide is mixed with an oxide or fluoride of one or more guest components with the addition of small quantities of water. This mixture is heated to temperatures of 100° to 500°C for about 30 minutes to 4 hours in a reaction vessel of inert material in an autoclave containing water under a pressure of between 1 and 500 atmospheres of an inert gas and/or oxygen or without the use of a foreign gas, and then kept for about 1 to 10 hours under constant conditions of temperatures and pressure. After cooling, the reaction product is powdered and washed free of chromate with water, filtered and dried under mild conditions. The nuclei of the chromium dioxide mixed phases are then again mixed with chromium trioxide and water to which guest components may again be added and then placed in an autoclave containing water under the pressure of between 1 and 500 atmospheres of an inert gas and/or oxygen or without a foreign gas, and heated to temperatures of 100° to 500°C and again left for about 1 to 10 hours at constant pressure and temperature.

In the above patent, chromium trioxide as a raw material is charged into an autoclave and the reaction is conducted in the presence of a small quantity of water. For example, at the time of the formation of nuclei, the initial pressure used in Examples of U.S. Pat. No. 3,371,043 is 100 atm of $O_2$, but even in Example 7, the initial pressure consists of oxygen and nitrogen partial pressures of 50 atm and 50 atm, respectively, and the pressure during heating is disclosed as being adjusted to 200 atm. Although this patent teaches a pressure range of from about 1 to 500 atmospheres, operation at normal pressures of about 1 atmosphere absolute or at reduced pressure is not disclosed.

The present invention is an improvement in the prior art process of the production of chromium dioxide. That is, the process of the present invention can be accomplished more easily and with less danger because the reaction can be conducted at normal pressure. High skill is not required and thus the manufacturing cost can be lowered.

In addition, the prior art discloses the formation of a reaction product of a primary paste and muddy product which is washed with water to remove the unreacted chromium ion. It is well known that the unreacted hexavalent chromium ion is toxic to animals and plants and the presence of more than 1 ppm of the hexavalent Cr ion in the industrial waste water must absolutely be avoided in some countries due to government regulations, e.g., Japan. In this respect, the present invention makes it possible to avoid such pollution by conducting the thermal decomposition sufficiently to produce a primary reaction product in a form of a solid mass below normal pressure, which is then comminuted. To prepare a pure chromium dioxide, the decomposition of chromium trioxide is unavoidable under high pressure. In view of the fact that the attempt to prepare chromium dioxide by decomposing a chromium compound under normal pressure has failed in the past, the essential difference in preparing chromium dioxide between high pressure and normal pressure is well recognized in the art. It is preferred to conduct the reaction under normal or reduced pressures rather than under high pressure from a practical standpoint in view of considerations such as installation capital, easy operability and maintenance.

SUMMARY OF THE INVENTION

According to the method of the present invention, $CrO_3$, or a mixture of $CrO_3$ and suitable additives, if necessary, is heated to a temperature higher than 100°C, preferably 300°–800°C, under a reduced pressure, i.e., at an absolute pressure of from 0.1 to 0.95 atmosphere and the product thus formed is mixed with $CrO_3$, and then the resultant mixture is treated at a high temperature, preferably at 300°–600°C and at a high pressure, preferably at 10–600 atmospheres to thereby produce the desired product.

DESCRIPTION OF THE PREFERRED EMBODIMENTS

As is well known, $CrO_3$ is generally called chromium (VI) oxide, chromium trioxide, or chromic anhydride and is commercially available as a general reagent or as an industrial raw material under the above-mentioned names. $CrO_3$ itself is a deliquescent dark-red acicular crystal and is soluble in water.

In order to produce a ferromagnetic chromium dioxide by the method of this invention, $CrO_3$ may be used alone but in order to obtain a ferromagnetic material having better magnetic characteristics, it is desirable to employ a mixture of $CrO_3$ and an additive, or additives. Effective additives for improving the magnetic characteristics of the ferromagnetic chromium dioxide include various kinds of compounds such as oxides, chlorides, nitrates, and the like, of Te, Sb, Pt. Fe, Co, Ni, Se, Li, Na, K, Be, Mg, Al, Ga, In, Ge, Sn, As, Cu, Zn, Sc, Ti, Zr, Nb, and Mn. Since these compounds are treated, after being mixed with $CrO_3$, under high pressure and high temperature conditions, almost the same results can be obtained regardless of the type of additive compound employed.

The high temperature and high pressure treatment according to the present invention indicates that the temperature is higher than 150° C and that the pressure is higher than absolute atmospheric pressure.

As a result of the investigation of the present invention it was found that more improved chromium dioxide is obtained as a secondary reaction product when the first reaction was made under reduced pressure. Further there are advantages such that the reproduction in each batch is easy and stable because the product in the form of a solid mass is comminuted, and that the harmful gases generated during the decomposition can be adsorbed by an adsorbent such as water under a slightly reduced pressure.

The present invention will be further illustrated by the following examples, in which the merits of the present invention are shown by comparison of the magnetic characteristics of samples prepared by the method of this invention with those of samples prepared by a conventional method. Pressures are absolute.

EXAMPLE 1

Four kinds of mixtures of 50 g. of $CrO_3$ and 5 g. of $TeO_2$ were prepared and each of the mixtures was charged into a 1000 ml. stainless steel vessel followed by heating for one hour to 600°C, at 0.95 atm, 0.5 atm, 0.2 atm and 0.1 atm respectively, whereby a dark grey product, which was considered to be mainly composed of a Cr compound, was obtained. Thereafter, each of the prepared products was added to a mixture of 800 g. of $CrO_3$ and 120 ml. of water in a two liter stainless steel autoclave and the resultant mixture was treated at a pressure of 270 atms. and at a temperature of 350°C for 16 hours. By purifying the product thus produced, black particles of ferromagnetic chromium dioxide were obtained. The magnetic characteristics and the grain sizes of the ferromagnetic material were measured, the results of which are shown in the following table.

Table 1

| Sample No. | (A) | (B) | (C) | (D) | (E) |
|---|---|---|---|---|---|
| 1 | 0.95 | 430 | 5400 | 1.0 × 0.1 | (+) |
| 2 | 0.5 | 420 | 5500 | 1.0 × 0.1 | " |
| 3 | 0.2 | 440 | 5350 | 0.7 × 0.08 | " |
| 4 | 0.1 | 410 | 5400 | 0.5 × 0.09 | " |
| Control Sample 1 | 250 | 320 | 5400 | 2 × 0.2 | " |
| Control Sample 2 | no seed | 40 | 5500 | 4 × 1 | (−) |

Note:
(A) Condition (atm.) for forming seed;
(B) Coercive force (oe);
(C) Maximum magnetic flux density (gauss);
(D) Grain size (length × diameter) ($\mu \times \mu$);
(E) Magnetic recordability;
(+) = Suitable;
(−) = Unstuitable.

In addition, Control sample 1 shown in the above table was a ferromagnetic material prepared by forming seed grains under a pressure of 250 atms. using the same raw material as above and by treating the seed by the same manner as above. Control sample 2 was prepared by treating $CrO_3$ under a pressure of several hundred atmospheres and at a temperature of higher than 400°C in the presence of a small amount of water as described above.

As is clear from the result shown in Table 1, the ferromagnetic material prepared according to the method of the present invention has superior properties as compared with the properties of the control samples; that is the coercive force thereof is extremely high, the material has suitable magnetic recordability, and also since the ferromagnetic material has a small grain size and has a large length to diameter ratio, the ferromagnetic particles can be readily magnetically oriented when they are dispersed in a solution of binder and applied to a support during the preparation of magnetic recording media. Moreover, the magnetic recording medium prepared by using the ferromagnetic chromium dioxide produced by the method of this invention has a high magnetic recording density.

On the other hand, Control sample 2, prepared by the aforesaid conventional, one-step method using no seed grains, had a coercive force of 40 oe. and was unsuitable for use as a magnetic recording medium.

Furthermore, Control sample 1, prepared by a two-step method but by conducting the forming of the seed particles under high temperature and high pressure conditions, had a high coercive force but not as high as that of the ferromagnetic substance prepared by the method of this invention. Further, by employing a conventional method, it was impossible to produce fine particles of ferromagnetic material. Also, the ratio of length to diameter of the ferromagnetic particles obtained by the conventional method was not as high as that of the samples prepared by the method of the present invention.

EXAMPLE II

The influence of additives on the properties of the ferromagnetic chromium dioxide materials is shown by this example.

A mixture of 50 g. of $CrO_3$ and 5 g. of the additive shown in Table 2 was charged into a 1 liter stainless steel vessel and treated for 90 minutes at 500°C under a pressure of 0.5 atm, whereby a black-grey product, which was considered to be mainly composed of a Cr compound, was obtained.

The entire amount of the aforesaid product was added to a mixture of 800 g. of $CrO_3$ and 120 ml. of water in a two liter stainless steel autoclave and the system was treated for 16 hours at a temperature of 350°C and under a pressure of 270 atmospheres.

The magnetic characteristics and the grain sizes of the black ferromagnetic chromium dioxide particles thus obtained were measured, the results of which are shown in the following table.

Table 2

| Sample No. | Additive | Coercive Force (oe) | Max. Magnetic Flux Density (gauss) | Particle Size ($\mu \times \mu$)/ (length × diameter) |
|---|---|---|---|---|
| 1 | $TeO_2$ | 420 | 5500 | 1.01 × 0.1 |
| Comparative Sample 1 | " | 340 | 5500 | 1.70 × 0.4 |
| 2 | $Sb_2O_5$ | 400 | 5400 | 0.55 × 0.1 |
| Comparative Sample 2 | " | 310 | 5450 | 0.88 × 0.3 |
| 3 | $TeO_2$-$Sb_2O_5$ (1:1 by weight) | 435 | 5400 | 0.55 × 0.1 |
| Comparative Sample 3 | " | 375 | 5300 | 0.90 × 0.3 |
| 4 | $H_2[PtCl_6]6H_2O$ | 305 | 5450 | 1 × 0.2 |
| Comparative Sample 4 | " | 260 | 5400 | 1.3 × 0.4 |
| 5 | $Nb_2O_5$ | 195 | 3700 | 0.5 × 0.2 |
| Comparative Sample 5 | " | 165 | 3650 | 0.85 × 0.35 |
| 6 | LiCl | 137 | 4600 | 1 × 0.4 |
| Comparative Sample 6 | " | 109 | 4550 | 1.8 × 0.8 |
| 7 | $FeCl_3$ | 155 | 5400 | 1.5 × 0.7 |
| Comparative Sample 7 | " | 134 | 5400 | 1.8 × 1.0 |
| Comparative Sample 8 | none | 40 | 5500 | 4 × 1 |

Comparative samples 1–7 were prepared by the same procedure as samples 1–7, except that the seed grains were produced under a pressure of 310 atmospheres. Comparative sample 8 was a ferromagnetic substance prepared by the above-mentioned one-step conventional method.

From the results shown in the above table, it was confirmed that the ferromagnetic substances obtained by the method of the present invention had improved coercive force as compared with those of the control samples prepared by the conventional methods. The grain sizes of the ferromagnetic substances prepared by the method of this invention were acicular in form.

EXAMPLE III

The same method as in Example II above was followed by employing a pressure of 0.8 atmospheres for forming the seed grains, using 5 g. of $TeO_2$ as the additive and at a seed-forming temperature of 120°C, 200°C, 300°C, 400°C, 500°C, 600°C, 700°C, or 800°C, respectively.

Thus, a mixture of 50 g. of $CrO_3$ and 5 g. of $TeO_2$ was charged into a 1 liter stainless steel vessel and the respective mixtures were each heated to the aforesaid temperatures under a pressure of 0.8 atmospheres. The product thus obtained was added to a mixture of 800 g. of $CrO_3$ and 120 ml. of water in a two liter stainless steel autoclave and the system was treated for 16 hours at 450°C. and under a pressure of 300 atmospheres. By purifying the product obtained by the treatment, a ferromagnetic chromium dioxide substance was obtained in the form of fine particles.

Now, in the example, the mixture of 50 g. of $CrO_3$ and 5 g. of $TeO_2$ was first treated at a temperature of 100°C and under a pressure of 0.8 atmospheres, but no fusion of $CrO_3$ occurred. When the treatment was conducted at 120°C and 200°C, the $CrO_3$ was fused and the fused solution from the first step could be used as is in the second step of the present invention. On the other hand, when the treatment was conducted at 300°C, the product was subjected to thermal decomposition while generating yellow gas, but when the product was allowed to cool, the product became solidified to form a solid product mainly consisting of $Cr_2O_5$, which was difficult to pulverize. Thus, in such a case, the product was crushed into particles before the product was cooled and then the crushed product was supplied to the second step of the reaction. In such a case, the employment of a reduced pressure of 0.8 atmospheres gave the advantage that the toxious gas generated by the high temperature operation was not released into the room from the reaction system. When the aforesaid treatment was conducted at a temperature of higher than 400°C, the decomposition reaction for producing the seed readily occurred and a black-grey product mainly consisting of green $Cr_2O_5$ was obtained. The product was then treated further in the second step to form the ferromagnetic chromium dioxide grains.

The magnetic characteristics and the particle size of the ferromagnetic particles thus obtained were measured and the results are shown in Table 3.

In addition, the control sample shown in Table 3 was a ferromagnetic substance prepared by adding 5 g. of $TeO_2$ directly to a mixture of 800 g. of $CrO_3$ and 120 ml. of water in the two liter stainless steel autoclave instead of adding the seed particles and treating the mixture in the autoclave as in the above-mentioned procedure.

Table 3

| Sample No. | (A) | (B) | (C) | (D) |
|---|---|---|---|---|
| 1 | 120 | 310 | 5400 | 1.0 × 0.1 |
| 2 | 200 | 370 | 5400 | 1.5 × 0.2 |
| 3 | 300 | 365 | 5300 | 1.0 × 0.2 |
| 4 | 400 | 420 | 5350 | 0.6 × 0.1 |
| 5 | 500 | 410 | 5400 | 0.6 × 0.1 |
| 6 | 600 | 435 | 5400 | 0.6 × 0.1 |
| 7 | 700 | 400 | 5400 | 0.6 × 0.1 |
| 8 | 800 | 415 | 5400 | 0.6 × 0.1 |
| Control Sample | — | 150 | 5500 | 4 × 1 |

Note:
(A) Reaction temperature for forming the seed particles - °C;
(B) Coercive force in oe;
(C) Maximum magnetic flux density in gauss; and
(D) Grain size in μ × μ

From the results shown in the above table, it was confirmed that the coercive forces of the ferromagnetic products were considerably varied according to the nature of the seed particles employed (that is, the temperature employed for producing the seed particles in the first step), and when the reaction temperature for forming the seed particles was higher, the coercive force of the ferromagnetic substance obtained was considerably higher, thus, in order to effect the method of this invention, it is necessary to conduct the reaction of the formation of seed particles in the first step at a temperature higher than 100°C, preferably at a temperature of 300°–800°C.

What is claimed is:

1. A method of producing high coercive force ferromagnetic chromium dioxide of improved coercivity consisting essentially of:

a. heating $CrO_3$ or a mixture of $CrO_3$ with an additive comprising an oxide, chloride or nitrate of Te, Sb, Pt, Fe, Co, Ni, Se, Li, Na, K, Be, Mg, Al, Ga, In, Ge, Sn, As, Cu, Zn, Sc, Ti, Zr, Nb, and Mn at a temperature higher than 100°C and at a pressure of from 0.1 to 0.95 atmosphere of absolute pressure; and b. heating a mixture of $CrO_3$ and the product of step (a) at a temperature of above 150°C and at a pressure of from 10 to 600 atmospheres in an aqueous medium.

2. The method of producing a ferromagnetic chromium dioxide according to claim 1, wherein said additive is selected from the group consisting of $TeO_2$, $Sb_2O_5$, $H_2(PtCl_6).6H_2O$, $Nb_2O_5$, LiCl, and $FeCl_3$.

3. The method of producing a ferromagnetic chromium dioxide according to claim 1 wherein step (b) is conducted at a temperature of from 300° to 600°C.

4. The method of producing a ferromagnetic chromium dioxide according to claim 1 wherein step (a) is conducted for a period of time of from 1 to 1.5 hours.

5. The method of producing a ferromagnetic chromium dioxide according to claim 1 wherein step (a) is conducted in the presence of water.

6. A method of producing high coercive force ferromagnetic chromium dioxide of improved coercivity consisting essentially of:

a. heating a mixture of $CrO_3$ with an additive comprising an oxide, chloride or nitrate of Te, Sb, Pt, Fe, Co, Ni, Se, Li, Na, K, Be, Mg, Al, Ga, In, Ge, Sn, As, Cu, Zn, Sc, Ti, Zr, Nb and Mn at a temperature of from 300° to 800°C and under a pressure of from 0.1 to 0.95 atmosphere of absolute pressure; and b. heating a mixture of $CrO_3$ and the product of step (a) at a temperature of from 300° to 600°C and under a pressure of from 10 to 600 atmospheres in an aqueous medium.

* * * * *